(12) United States Patent
Terreni

(10) Patent No.: US 8,236,218 B2
(45) Date of Patent: Aug. 7, 2012

(54) METHODS OF MANUFACTURING INTEGRAL ELASTIC SUPPORTS

(75) Inventor: Paolo Terreni, Carre' (IT)

(73) Assignee: Selle Royal SpA, Pozzoleone (IT)

( * ) Notice: Subject to any disclaimer, the term of this patent is extended or adjusted under 35 U.S.C. 154(b) by 786 days.

(21) Appl. No.: 11/995,319

(22) PCT Filed: Aug. 10, 2006

(86) PCT No.: PCT/IB2006/052762
§ 371 (c)(1),
(2), (4) Date: Jan. 11, 2008

(87) PCT Pub. No.: WO2007/020571
PCT Pub. Date: Feb. 22, 2007

(65) Prior Publication Data
US 2008/0193699 A1   Aug. 14, 2008

(30) Foreign Application Priority Data
Aug. 12, 2005   (IT) .............................. VI2005A0231

(51) Int. Cl.
*B29C 45/14*   (2006.01)
(52) U.S. Cl. ........................ 264/250; 264/263; 264/275
(58) Field of Classification Search ........................ None
See application file for complete search history.

(56) References Cited

U.S. PATENT DOCUMENTS

| 3,000,058 | A | | 9/1961 | Thielen |
| 3,345,664 | A | * | 10/1967 | Ludwig ........................ 12/142 R |
| 3,718,726 | A | * | 2/1973 | Taylor ........................... 264/219 |
| 3,983,204 | A | * | 9/1976 | Opinsky et al. ............... 264/244 |
| 5,176,860 | A | | 1/1993 | Storch |
| 5,415,540 | A | | 5/1995 | Proksa |
| 5,441,676 | A | | 8/1995 | Bigolin |
| 2006/0263551 | A1 | | 11/2006 | Tomeo |

FOREIGN PATENT DOCUMENTS

WO   WO 2005/051629 A1 *   6/2005

* cited by examiner

*Primary Examiner* — Edmund H. Lee
(74) *Attorney, Agent, or Firm* — Themis Law

(57) ABSTRACT

The present invention is applicable to the field of sport and leisure accessories and particularly relates to a process for making integral elastic supports as well as to integral elastic supports obtainable by such process. The invention also relates to a mold for making such supports, as well as a molding apparatus including such mold, for carrying out the above process. The process includes the step of forming at least one pad element from a resilient material, to be associated to a frame made of a substantially rigid or semirigid material whose outer edge defines a peripheral portion in combination with said pad. The process is characterized further includes the step of forming a bead from a substantially waterproof material near the peripheral portion to prevent any undesired infiltration into such portion.

16 Claims, 7 Drawing Sheets

METHODS OF MANUFACTURING INTEGRAL ELASTIC SUPPORTS

FIELD OF THE INVENTION

The present invention is applicable to the field of sport and leisure accessories and particularly relates to a process for making integral elastic supports as well as to integral elastic supports obtainable by such process.

The invention further relates to a mold for making such supports.

Typical examples of integral elastic supports that can be formed according to the present invention include seat backs and seats for anatomic chairs, especially designed for elderly and disabled people, footwear insoles, orthopedic and non-orthopedic mattresses, saddles for bicycles, cycles, motorcycles and the like.

BACKGROUND OF THE INVENTION

Elastic supports of the above type are known which generally comprise a base element of rigid or semirigid material, a padding or filling element made of a resilient material, usually polyurethane resin and/or gel, and a sheet cover element, usually of imitation leather or the like, which is designed to contact a seated user.

Various processes for forming such types of supports are also known, which are all intended to join together the above elements, in one or more steps, to form a comfortable and resistant final product.

European patent EP-B1-0653279, by the applicant hereof, discloses a process for forming supports of the above mentioned type, which uses a male—female mold, in which the various elements are successively laid.

Particularly, the female mold, which has a negative forming cavity conformed to the shape of the top surface of the support to be formed, first receives the cover element, with the bottom surface facing upwards. Such female mold further has vacuum means for the element to be laid with no surface fold or unevenness.

The resilient element is then placed, still in the liquid state, on the cover element. Such resilient element contains blowing agents, usually CFC gases, which will provide the typical highly porous honeycomb structure of such types of padding.

Then the mold is closed, by coupling the male part, with the base element thereon, to the female part. The structure is left in the mold, which is adequately heated, for a sufficient time and at a sufficient temperature to allow resin expansion and curing of the resin and/or gel. In this step, the resin and/or gel are "bonded" to the base element and the cover element, thanks to chemical and/or physical interaction of such elements. In the last step of the process, the final product is finished and all flashes of excess material are trimmed, typically by a manual operation.

Such prior art process has the apparent drawback that the supports formed thereby have a water-pervious peripheral edge, and allow water to penetrate the structure, thereby causing cover element removal with time. This is caused by the high porosity of the elastic resin, which is naturally subjected to liquid absorption. Furthermore, if the support contains gel, water contact has to be necessarily avoided, to prevent gel decomposition. This problem would be also dramatically aggravated by an imperfect finishing step, which is likely to occur, considering it is a manual operation.

WO2005/051629, in the name of the same applicant, discloses a process for making integral elastic supports of the above type, including a step in which an annular sealing rim is formed on the base element, to create a preferential thickening area for the expandable resin, to further facilitate the succeeding manual support finishing step.

While this solution meets the intended requirements, it does not wholly solve the problem of water penetrating the filling element. This is caused by the sealing bead being still exposed to weather between the base and the padding.

No solution against liquid penetration at the edge portions of elastic elements having a relatively highly porous filling element has been provided heretofore in prior art.

Also, both the above solutions have other apparent drawbacks.

First, when the CFC-containing resin thickens on the cover element, a layer (known as "chemical skin") is actually formed therebetween, which makes the support uncomfortable for use and affects resin elasticity.

Furthermore, these prior art processes use an excessive amount of resin, most of it being required to form the sealing bead. This waste is further aggravated by the need of using a highly porous resin in an area that has to be as waterproof as possible, for the reasons stated above.

Finally, the use of CFC blowing agents is highly hazardous for the environment.

SUMMARY OF THE INVENTION

The object of this invention is to overcome the above mentioned drawbacks, by providing a process that is highly efficient and reproducible.

A particular object is to provide a process that allows simple and effective formation of integral elastic supports having waterproof peripheral edges, to preserve the integrity of the support and extend the life thereof.

Another object is to provide a process that allows to minimize product fabrication costs.

Yet another object of the invention is to provide an environment-friendly process.

A further object of the invention is to provide a waterproof elastic support that is highly convenient and comfortable.

These and other objects, as better explained hereafter, are fulfilled by a process for making integral elastic supports, which comprises the step of forming at least one pad element from a resilient material, associated to a frame made of a substantially rigid or semirigid material whose outer edge defines, in combination with the pad, a peripheral portion.

According to the invention, the process comprises a step of forming a bead from a substantially waterproof material near said peripheral portion.

The inventive process prevents any undesired liquid infiltration in such portion, to preserve the integrity of the support and extend its life.

Advantageously, the base material of the waterproof bead may have a higher rigidity than the pad material.

Conveniently, the bead may be formed by adding the substantially rigid and waterproof material along the peripheral portion to at least partly contact the pad and the frame, so that a higher stability of the assembly is achieved.

Furthermore, if a cover element is associated to the pad, the bead is at least partly in contact with such cover, for greater resistance of the support.

Conveniently, the steps of the process may be carried out using a mold which is composed of a female part having a cavity whose shape substantially conforms to the outer shape of the pad and a male part having at least one housing for the frame. The male part may have a first and a second male members which may be selectively and alternately coupled to a corresponding female part. Furthermore, the first and second male members face each other and are pivotally journalled about an axis of rotation for engagement with the female part.

Thanks to this particular configuration, the process of the invention is highly efficient, as it minimizes reject rates and is also cost-effective.

Conveniently, the first and second male members may have a common portion, corresponding to the housing for the frame, and are different in that only the second male member has a peripheral trough for the waterproof bead to be formed at the peripheral portion of the frame, by injection of the waterproof material into the peripheral trough.

Thanks to the above features, the waterproof bead is very easy to form and highly reproducible.

Advantageously, the process of the invention may comprise a step in which a gasket ring is formed at the peripheral portion, for coupling with and abutment against the peripheral trough.

This will prevent any leakage of the injected waterproof material, thereby minimizing waste.

In another aspect of the invention, an integral elastic support as defined in claim 15 is provided, which comprises a frame of a substantially rigid or semirigid material having an outer edge and at least one pad element of a resilient material, which is associated to the frame and defines a peripheral portion in combination with the peripheral edge of the frame. According to the invention, the support comprises a bead of a substantially liquid-impervious material near said peripheral portion.

Thanks to this configuration, the integral elastic support of the invention prevents any undesired infiltration in its peripheral portion.

Suitably, the waterproof material may comprise a relatively low porosity resin, whereas the resilient material may comprise a relatively high porosity resin.

Thanks to the above features, the supports of the invention will be highly convenient and comfortable, and their water resistance will be unaltered. This results from the combined convenience of a resilient high porosity resin and a waterproof low porosity resin.

Furthermore, the resilient material may advantageously comprise a blowing agent that does not contain CFC gases. Thus, the supports may be fabricated in compliance with antipollution standards.

According to yet another aspect of the invention, there is provided a mold for forming integral elastic supports.

BRIEF DESCRIPTION OF THE DRAWINGS

Further features and advantages of the invention will be more apparent from the detailed description of a preferred, non-exclusive embodiment of a process, an integral elastic support, a mold and a molding apparatus according to the invention, which are described as a non-limiting example with the help of the annexed drawings, in which.

DETAILED DESCRIPTION OF A PREFERRED EMBODIMENT

Figure 1:
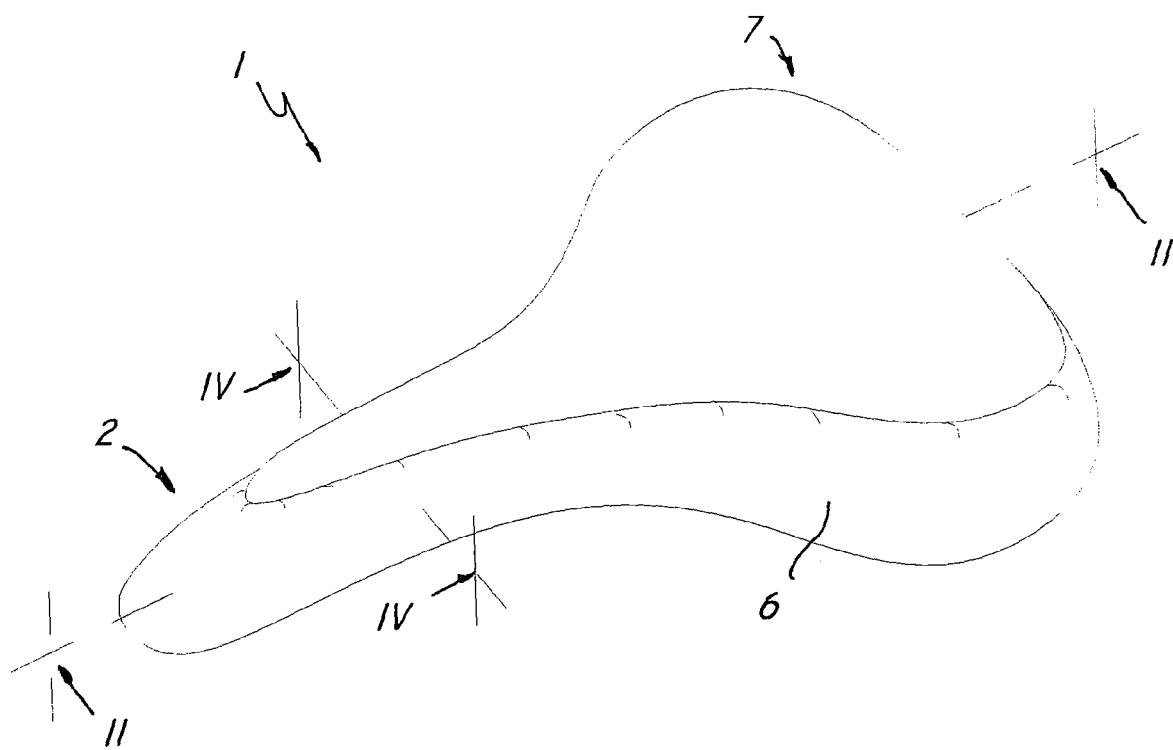
FIG. 1 is a perspective view of an integral elastic support according to the invention.

Referring to the above figures, the integral elastic support of the invention, generally designated by numeral 1, may be in the form of a cushion, a backseat, a mattress or a saddle for bicycles or the like, as shown in FIG. 1.

Figure 2:
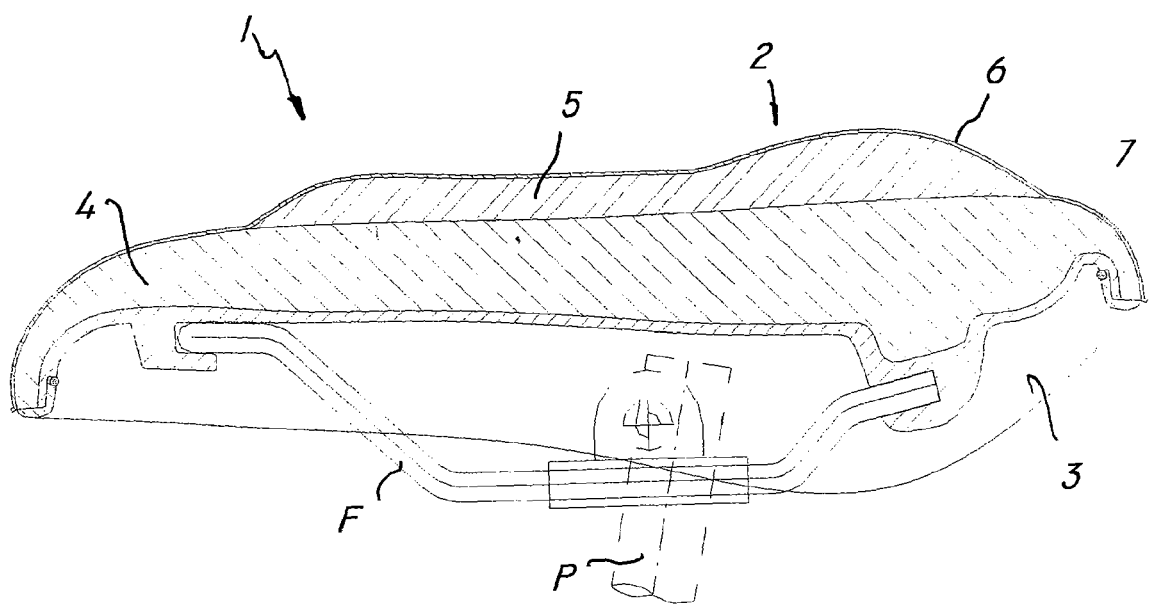
FIG. 2 is a view of the support of FIG. 1, as taken along a plane II-II.

Generally, the support 1 consistently comprises a pad element, overall designated by numeral 2, made of a resilient material, which is associated to a base frame 3 connected to the seat post P of a bicycle by a saddle rail F. The resilient material may include a resin, a gel or a combination thereof, as shown in FIG. 2, in which numeral 4 designates the resin layer and numeral 5 designates the gel layer, whose arrangement may be reversed or changed without departure from the scope of the invention.

The resin is preferably a polyurethane resin having a relatively high porosity and a density, without limitation, of 0.05 g/cm$^3$ to 0.3 g/cm$^3$. The gel, if any, may be a polyurethane mixture such as LEVAGEL® sold by BAYER®, which may be obtained according to the teachings of patents U.S. Pat. No. 4,404,296 and U.S. Pat. No. 4,456,642. For mechanical reasons, the frame 3 is essentially formed of a rigid or semirigid polymer, composite, metal or wood material.

Optionally a seat surface for a user may be defined by covering the pad 2, as shown, with a cover element 6, whose top surface 7 defines such seat surface. The cover 6 may be made of leather, imitation leather, Lycra®, a polymer, possibly of the multilayer type, or the like, or a combination of one or more of these. Otherwise, the seat surface may be defined by the pad 2 itself, with a suitable surface finish.

Figure 3:
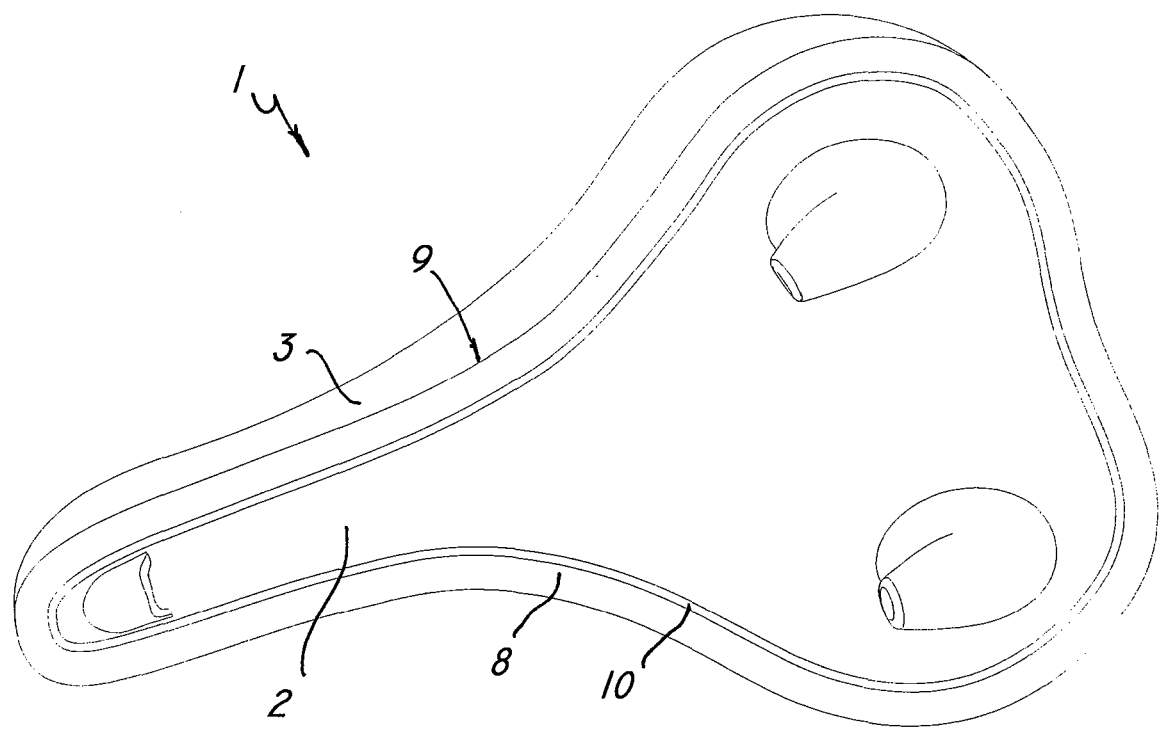
FIG. 3 is a further perspective view of an integral elastic support according to the invention.
Figure 4:
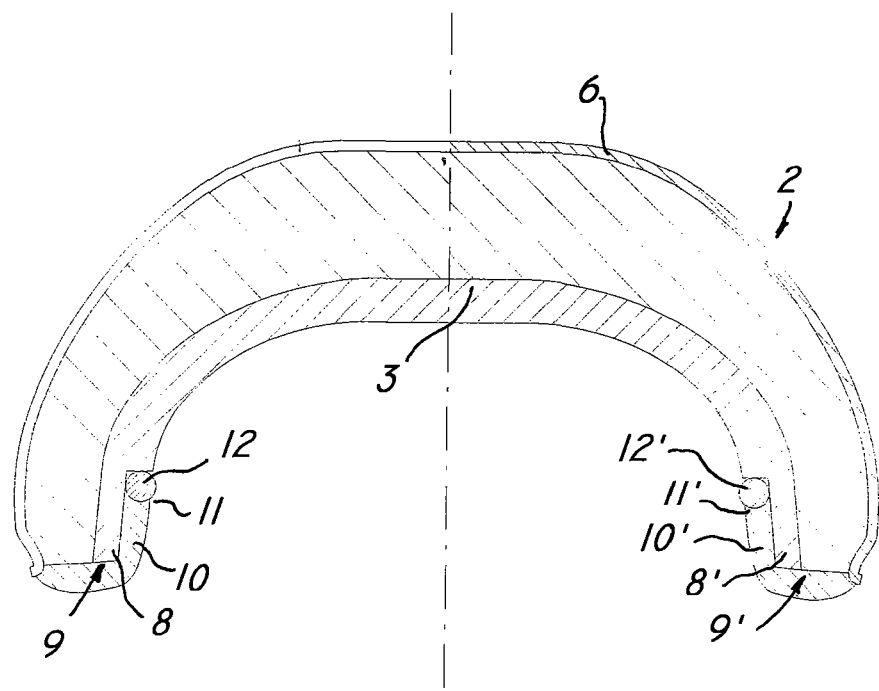
FIG. 4 shows the support of FIG. 3, as viewed along a plane IV-IV.

As clearly shown in FIGS. 3 and 4, the frame 3 comprises an outer edge 8 which defines a peripheral portion 9, in combination with the pad. A peculiar feature of the invention is the provision of a bead 10 made of a substantially waterproof material near the portion 9, to protect such portion from any undesired infiltration. Such material may be a low porosity polyurethane resin, having for instance, without limitation, a density of 0.5 to 1.2 g/cm$^3$, and may be deposited over a portion 9 interposed between the frame 3 and the pad 2. The bead 10 may have its end 11 in contact with a gasket ring 12 of the frame 3, whose function will be more apparent hereafter. It shall be understood that the bead 10 may be deposited near the portion 9 in partial or total extension, i.e. to partially or totally cover the annular extension of the edge 8, without departure from the scope as claimed below.

The integral elastic supports as disclosed herein may be advantageously formed using a process which, after the formation of the pad 2 associated to the frame 3, comprises the step of forming the bead 13 as described above, to waterproof the area near the portion 9.

Figure 5:
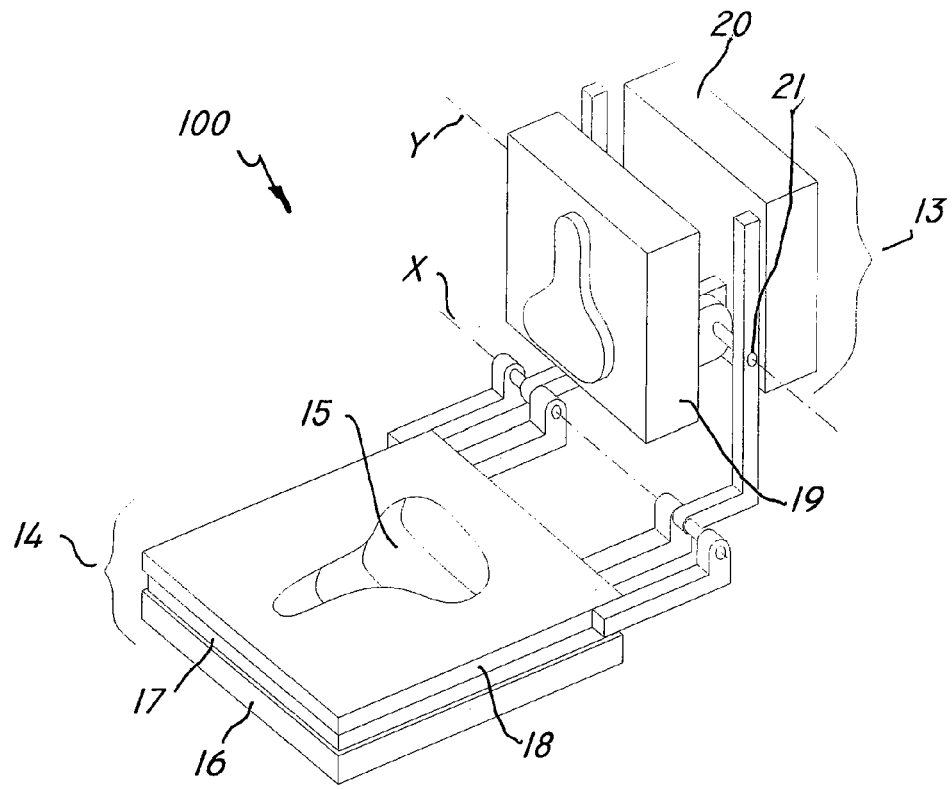
FIG. 5 is a perspective view of a mold according to the invention.

The inventive process steps are advantageously carried out using the mold 100 of FIG. 5, which comprises a male part, generally designated by numeral 13, and a female part, generally designated by numeral 14, the latter having a cavity 15 conforming to the outer shape of the pad 2, and designed to receive the various components of the support 1. As shown, the parts 13 and 14, which are pivotally journalled about the axis X for mutual engagement to move the mold from an open condition to a closed condition, are in turn composed of various elements.

The female part 14 consists of a first bottom plate 16 containing the cavity 15, another intermediate plate 17 for forming an undercut with respect to the cavity 15, and a third removable top retaining plate 18 for permanently securing the element 6.

On the other hand, the male part 13 comprises a first and a second male members, designated by numerals 19 and 20 respectively, which face each other and are pivotally journalled at 21 to pivot about the axis Y in such a manner as to be alternately and selectively coupled with the female part 14.

The members 19 and 20 are coupled together by clamps 22. It will be readily appreciated that the two members 19 and 20, which shall not necessarily be coupled together and/or be able to pivot, can be coupled with two separate female parts without departure from the scope, as defined in the annexed drawings.

Figure 6:
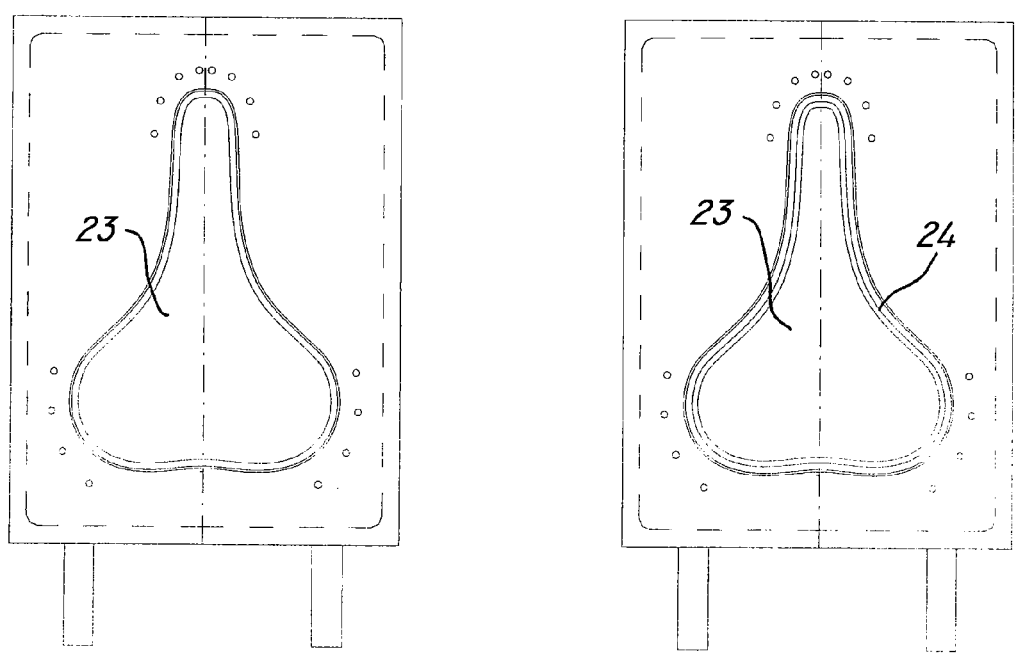
FIG. 6 is a top view of certain details of FIG. 6.
Figure 7:
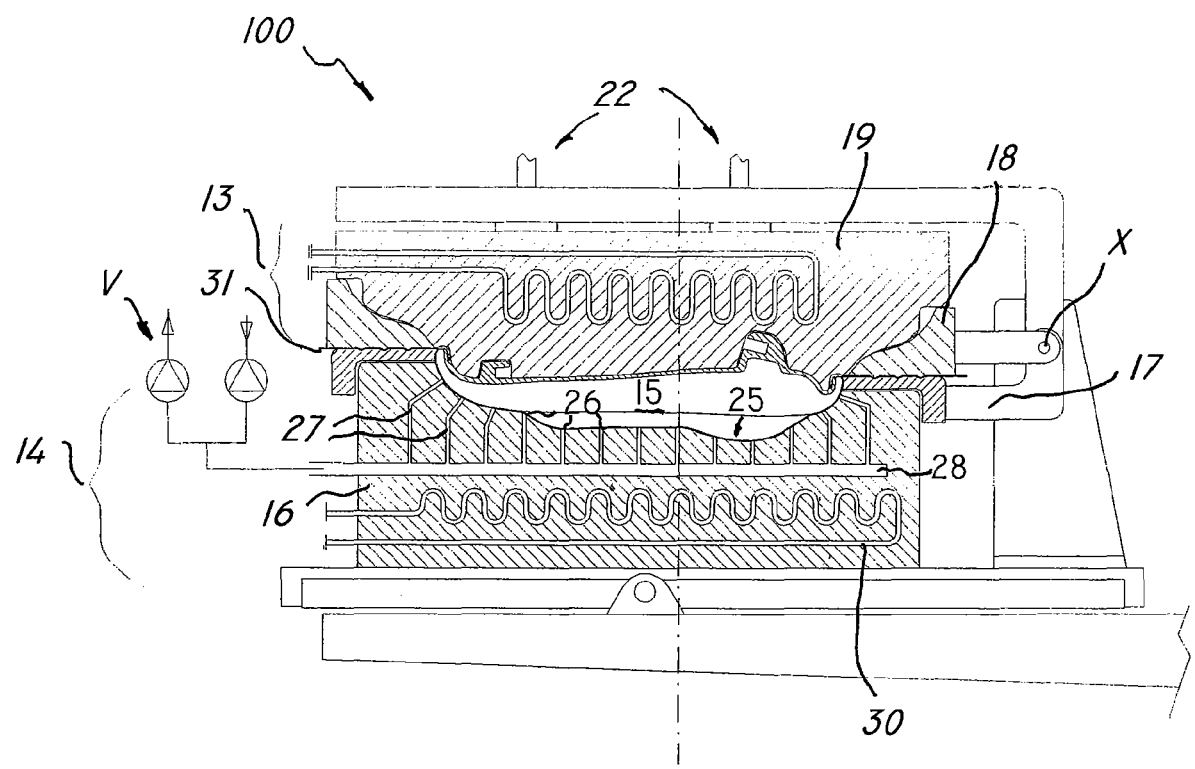
FIG. 7 is a partial sectional view of the mold according to the invention.

As particularly shown in FIGS. 6 and 7, the male members 19 and 20 are configured in such a manner as to have a common portion 23, corresponding to the housing for the frame 3, and are only different at the peripheral portion 9 of the frame 3, in which a peripheral recess 24 is provided for the formation of the waterproof bead 10.

Figure 8:
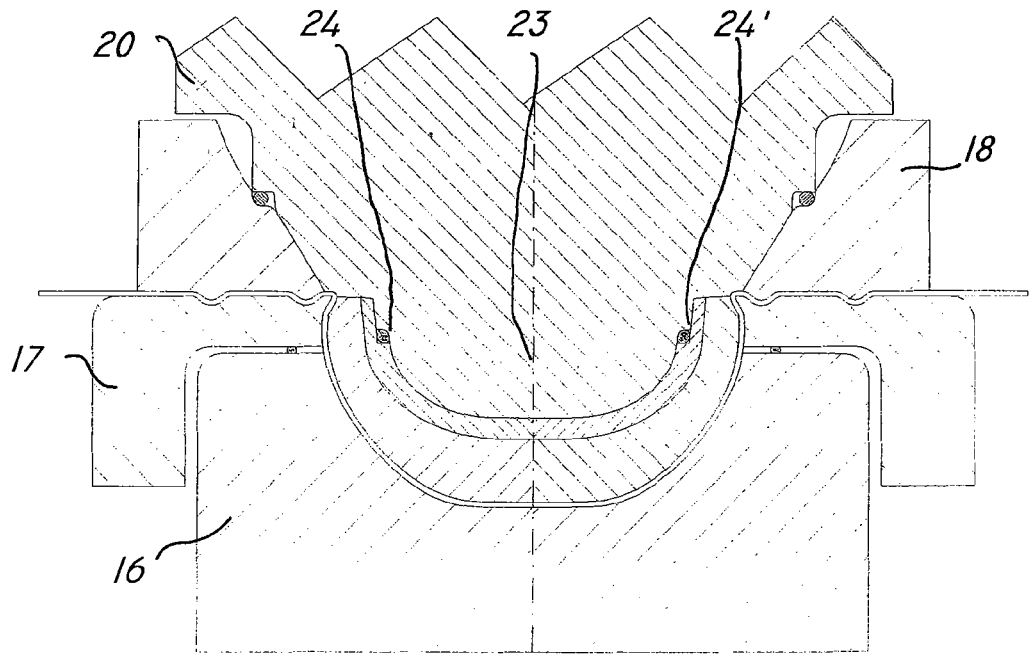
FIG. 8 is a sectional view of the mold of FIG. 7, as taken along a plane VIII-VIII.

Advantageously, referring to FIG. 8, the female part 14 of the mold 100 is configured as taught by the above mentioned patent EP-B-0653279. Particularly, a number of holes 26 are formed in the bottom 25 of the cavity 15, which communicate through channels 27 with a manifold 28 connected to external vacuum means V. Heating coils 29, 30 are further provided to heat the element 19 and the plate 16 respectively to the right temperature and maintain them at such temperature. The hole 31 for resin injection into the mold has a key role.

The functions and importance of the various components and the particular configuration of the mold 100 will be more apparent from the following detailed description of the steps of a process for making a support 1 according to the invention.

Figure 9:
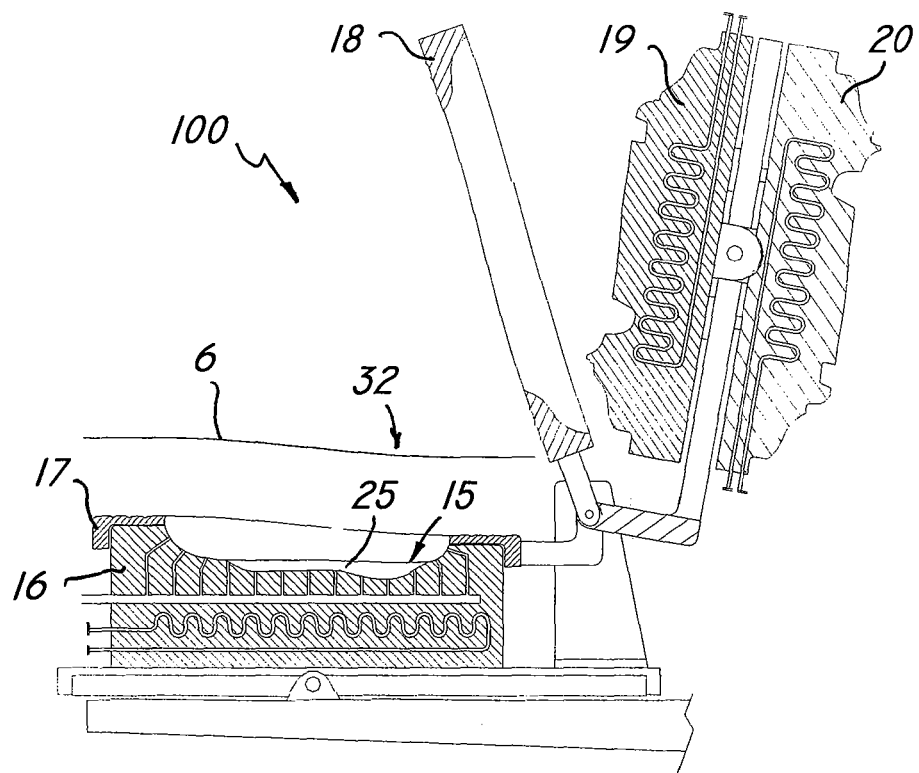
FIGS. 9 to 16 show various steps of the inventive process for making the supports of FIG. 1.

As a first step, the mold 100 is opened, with the undercut plate 17 secured to the element 16, and the cover 6 is laid on the bottom 25 of the cavity 15, with its bottom surface 32 facing upwards, as shown in FIG. 9. For practical reasons, the surface area of the cover 6 extends beyond the edge of the cavity 15.

Figure 10:
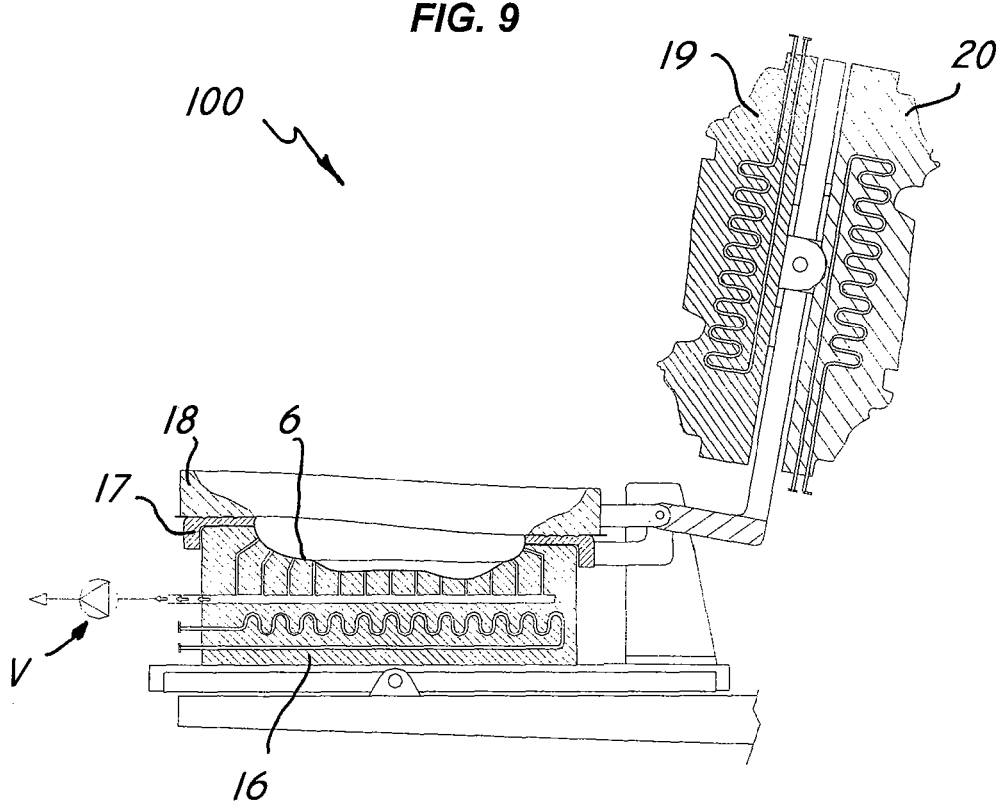

To fix the cover 6 and prevent any undesired movement thereof, the removable retaining plate 18 is laid over the undercut plate 17 so that the cover 6 is sandwiched therebetween. The vacuum means V are then actuated, to create a negative pressure in the cavity 15 and to permanently form the cover 6 on the bottom 25 thereof, as shown in FIG. 10.

Figure 11:
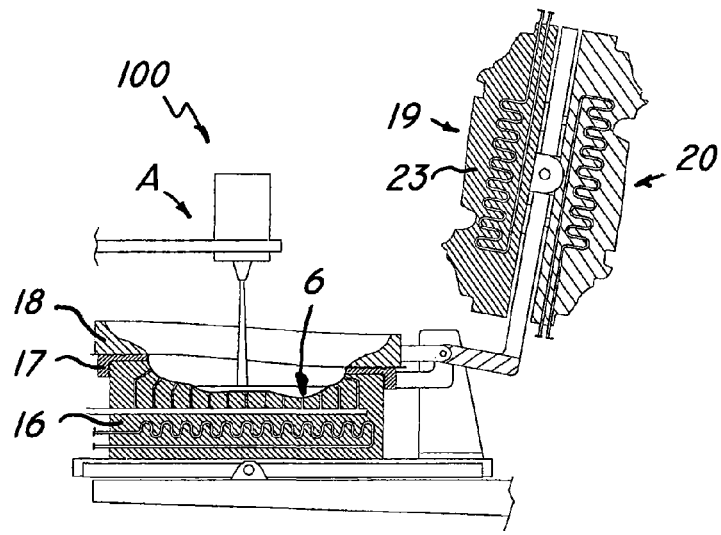

Then, the pad 2 is formed, by pouring the resin 4 and/or the gel 5 in the liquid state by a suitable foaming head A, as shown in FIG. 11. Alternatively, the resin and/or gel may be deposited in the mold by injection. During this step, a suitable blowing agent, preferably not containing CFC, e.g. a water-based blowing agent, may be added to the resin.

To facilitate curing of the gel and/or resin, the mold is previously heated, by the heating coils 29 and 30, to an operating temperature of 20° C. to 60° C., and preferably of 40° C. In these conditions, the curing time may be of 2 min to 6 min, and is preferably of about 3-4 min.

Figure 12:
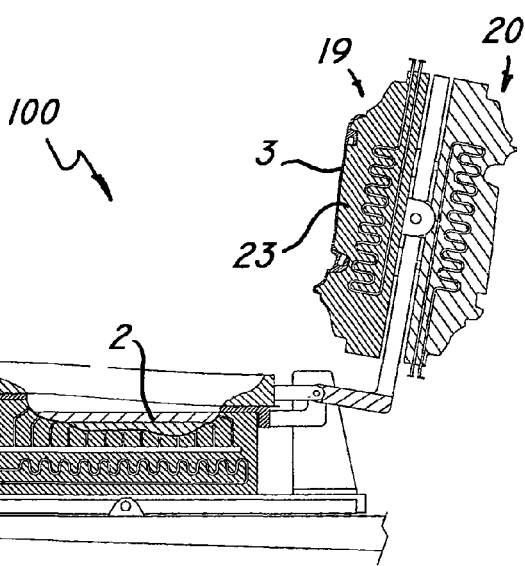
Figure 13:
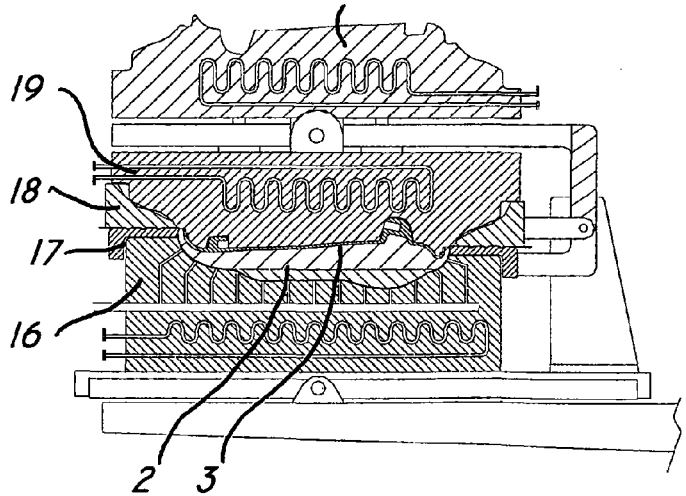

Now, once the frame 3 has been placed in the housing 23 of the first male part 19 (see FIG. 12), the mold is closed (see FIG. 13) and held closed for the above curing time, so that the pad 2 takes its final configuration and chemical and/or physical bonds are formed between it, the cover 6 and the frame 3.

Figure 14:
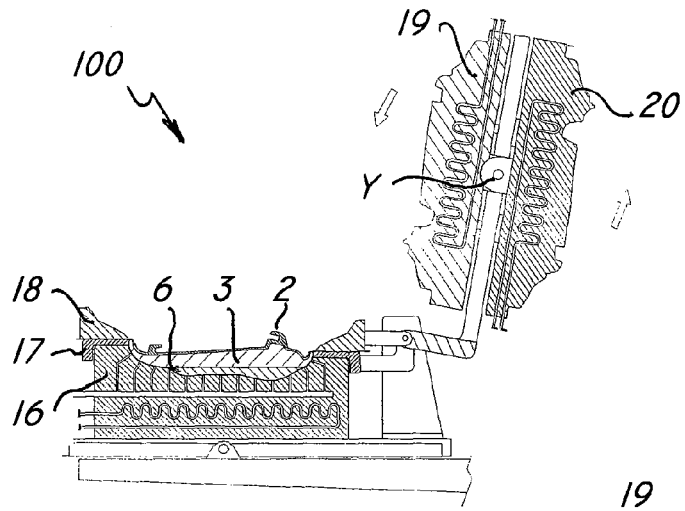
Figure 15:
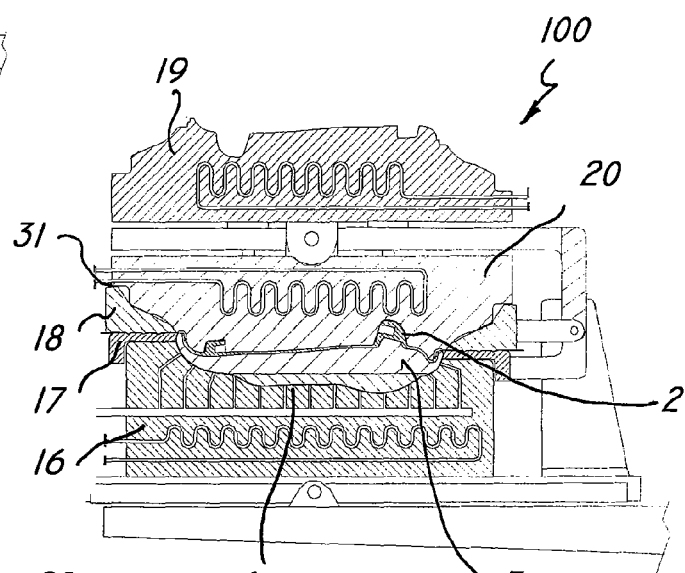
Figure 16:
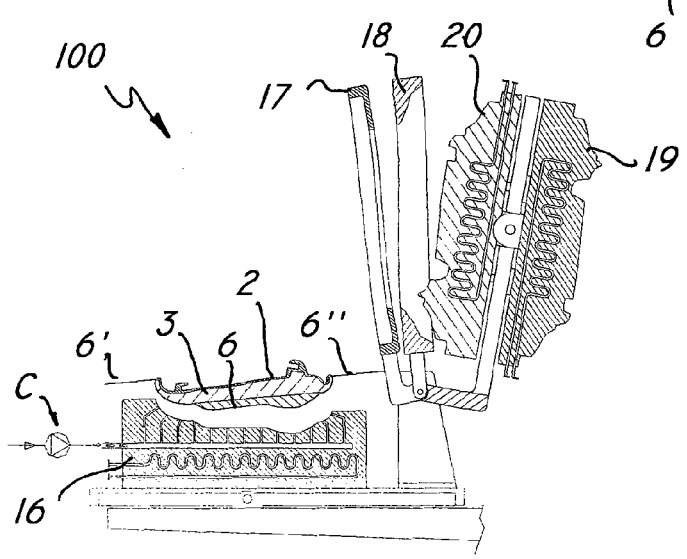

The mold is then opened, with a partially formed support 1 in the cavity 15 and the frame 3 associated to the pad 2 and the cover 6, and the members 19 and 20 are pivoted about the axis Y, for the second member to be coupled with the female part 14, as shown in FIG. 14.

Once such coupling has been prepared, the mold is closed and the waterproof material is injected through the hole 31 into the peripheral recess 24 to form the bead 10. This operation is facilitated by providing the frame 3 with a projection 12, that acts as an abutment for the second male part 20 at the recess 24. The curing time for the waterproof resin may be of 1-2 minutes.

After this time, the mold 100 is opened and the structure 1 is removed therefrom, with the help of a compressor C, having a reverse flow with respect to the vacuum means V.

To facilitate removal of the support 1, an appropriate mold release agent, possibly composed of well known paraffin solutions, may be applied to the bottom 25 and the housing 23.

By the final finishing step, i.e. trimming of excess edges 6' and 6" of the cover 6, the support 1 will take its final configuration.

The above steps may be carried out in a particularly effective manner by a molding apparatus comprising a plurality of molds as described above. Such apparatus may be mutatis mutandis constructed as taught by the above mentioned patent EP-B-0653279.

The above disclosure clearly shows that the process of the invention, as well as the integral elastic supports obtainable thereby, fulfill the intended objects and particularly the object of allowing a simple and effective fabrication of integral elastic supports having waterproof peripheral edges.

The above sequence of steps allow waterproofing of the peripheral portion 9 of the support 1, to preserve the integrity of the support and extend its life.

It will be further appreciated that, thanks to the particular configuration of the mold 100, product fabrication costs may be minimized, even as a result of using the molding apparatus of the invention.

It shall be further noted that, thanks to its particular configuration, the elastic support of the invention is highly convenient and comfortable.

The above process, product, mold and molding apparatus are susceptible of a number of changes or variants, within the inventive concept disclosed in the appended claims. All the details thereof may be replaced by other technically equivalent parts, and the materials may vary depending on different needs, without departure from the scope of the invention.

While the process, product, mold and molding apparatus have been described with particular reference to the accompanying figures, the numerals referred to in the disclosure and claims are only used for the sake of a better intelligibility of the invention and shall not be intended to limit the claimed scope in any manner.

What is claimed is:

1. A process for making integral elastic supports comprising the step of:
   forming a frame of a rigid or substantially rigid material to have an outer edge;
   forming at least one pad element from a resilient material;
   associating said pad element with said frame and defining with the outer edge of the frame a common peripheral portion, such that the outer edge of the frame and an outer edge of the pad element become disposed over one another; and
   forming a bead from a polymeric material enveloping at least partly said common peripheral portion;

wherein said step of forming said bead is carried out after said step of forming said at least one pad element and said step of associating said pad element to said frame and defining said peripheral portion, said polymeric material being a substantially waterproof material and being injected over said common peripheral portion to provide a waterproof area along said common peripheral portion and prevent any undesired infiltration in such common peripheral portion.

2. The process as claimed in claim 1, wherein said material of said bead is more rigid than the material of said pad.

3. The process as claimed in claim 2, wherein said bead is formed by adding said substantially rigid waterproof material along said peripheral portion, so that it contacts at least partly said pad and said frame.

4. The process as claimed in claim 1, further comprising the step of associating a cover element to said pad element, said bead being partly in contact with the cover element.

5. The process as claimed in claim 1, wherein said steps are carried out using a mold having at least one female part with a cavity whose shape substantially conforms to an outer shape of the pad, and a male part having at least one housing for said frame.

6. The process as claimed in claim 5, wherein said male part includes a first and a second male members rigidly connected one to the other, the second male member being configured to be coupled to said at least one female part.

7. The process as claimed in claim 6, wherein said first and said second male members face each other and are pivotally journalled about an axis of rotation to allow coupling thereof to said at least one female part.

8. The process as claimed in claim 7, characterized in that said male member has a portion configured for housing said frame.

9. The process as claimed in claim 8, further comprising the step of providing a trough on the second male member to house the waterproof bead.

10. The process as claimed in claim 9, wherein said pad element associated to said frame is formed using said at least one female part.

11. The process as claimed in claim 10, further including the steps of pivoting said male part about said axis of rotation and of bringing said second male member opposite to said at least one female part.

12. The process as claimed in claim 11, further comprising the steps of closing said mold by coupling said second male member with said at least one female part and then of injecting said waterproof material into said trough.

13. The process as claimed in claim 12, further comprising the step of forming a gasket ring on said frame at said peripheral portion, the gasket ring being designed to be coupled with and abut against a peripheral recess in the frame, and prevent any leakage of said waterproof material.

14. The process as claimed in claim 5, further including the step of laying a cover element in said cavity, which element has a bottom surface and a top surface, said top surface being designed to contact a seated user, said bottom surface facing upwards.

15. The process as claimed in claim 14, further comprising the step of permanently forming said cover element by creating vacuum on an inner side of said cavity.

16. The process as claimed in claim 14, further including the step of stably positioning said cover element by laying a removable retaining plate thereon.

* * * * *